(12) United States Patent
Noda

(10) Patent No.: US 12,159,131 B2
(45) Date of Patent: Dec. 3, 2024

(54) IN-VEHICLE INFORMATION PROCESSING APPARATUS, INFORMATION PROCESSING METHOD, AND CLIENT PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Tetsuya Noda, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 134 days.

(21) Appl. No.: 17/907,227

(22) PCT Filed: Mar. 16, 2021

(86) PCT No.: PCT/JP2021/010670
§ 371 (c)(1),
(2) Date: Sep. 23, 2022

(87) PCT Pub. No.: WO2021/193252
PCT Pub. Date: Sep. 30, 2021

(65) Prior Publication Data
US 2023/0105426 A1    Apr. 6, 2023

(30) Foreign Application Priority Data
Mar. 26, 2020 (JP) ................................. 2020-056689

(51) Int. Cl.
*G06F 8/65*    (2018.01)
*B60R 16/02*   (2006.01)
(Continued)

(52) U.S. Cl.
CPC ................ *G06F 8/65* (2013.01); *B60R 16/02* (2013.01); *H04L 67/12* (2013.01)

(58) Field of Classification Search
CPC ...... G06F 8/65; G06F 11/1004; G06F 21/572; G06F 8/656; G06F 11/1433; G06F 8/658;
(Continued)

(56) References Cited

U.S. PATENT DOCUMENTS 11,886,860 B2 *   1/2024   Pal ............................ G06F 8/65
11,928,900 B2 *   3/2024   Teraoka ................... G06F 8/60
(Continued)

FOREIGN PATENT DOCUMENTS

JP    2016-163244 A    9/2016

OTHER PUBLICATIONS

International Search Report, Application No. PCT/JP2021/010670, mailed Jun. 22, 2021. ISA/Japan Patent Office.

*Primary Examiner* — Thuy Dao
(74) *Attorney, Agent, or Firm* — Honigman LLP

(57) ABSTRACT

An in-vehicle information processing apparatus includes a client processing unit configured to be provided with a service and perform processing, the client processing unit receives, from a server processing unit configured to provide a service, a service providing message that includes identification information and version information of a service to be provided, determines whether or not the version information included in the received service providing message and version information of a service that the client processing unit desires to be provided match, and, if it is determined that the two types of version information do not match, the client processing unit examines whether or not it is possible to receive the service with different version information, and, if it is possible to receive the service with different version information based on an examination result, the
(Continued)

Search Message And Service Providing Message

| Header Information | Message Type | Service ID | Service Version | Option Information |
|---|---|---|---|---|
| | | | | |

"Search" Or "Provision"

Only Service Providing Message
IP Address
Port Number client processing unit receives the service and performs processing.

16 Claims, 10 Drawing Sheets

(51) Int. Cl.
*B60R 16/023* (2006.01)
*G06F 8/71* (2018.01)
*G06F 9/445* (2018.01)
*H04L 9/08* (2006.01)
*H04L 67/12* (2022.01)

(58) Field of Classification Search
CPC ..... G06F 8/654; B60R 16/02; B60R 16/0231; B60R 16/0238; B60R 16/023; H04L 67/12; H04L 9/0894; H04L 9/3247; H04L 67/34; H04W 4/40; H04W 4/50
See application file for complete search history.

(56) References Cited

U.S. PATENT DOCUMENTS

2003/0014470 A1    1/2003   Iijima
2014/0122726 A1    5/2014   Jafry et al.

\* cited by examiner

Search Message And Service Providing Message

| Header Information | Message Type | Service ID | Service Version | Option Information |
|---|---|---|---|---|
| | "Search" Or "Provision" | | | Only Service Providing Message IP Address Port Number |

IN-VEHICLE INFORMATION PROCESSING APPARATUS, INFORMATION PROCESSING METHOD, AND CLIENT PROGRAM

CROSS-REFERENCE TO RELATED APPLICATIONS

This application is the U.S. national stage of PCT/JP2021/010670 filed on Mar. 16, 2021, which claims priority of Japanese Patent Application No. JP 2020-056689 filed on Mar. 26, 2020, the contents of which are incorporated herein.

TECHNICAL FIELD

The present disclosure relates to an in-vehicle information processing apparatus, an information processing method, and a client program for performing processing that is based on a service provided by a server.

BACKGROUND

In recent years, development and the like of automated driving functions of vehicles has advanced, and there are demands for controlling more sophisticated in-vehicle systems. SOME/IP (Scalable service-Oriented MiddlewarE over IP) has been garnering attention as an architecture of service-oriented middleware for realizing such demands.

JP 2016-163244A proposes an ECU (Electronic Control Unit) that transmits identification information of a new service to an external apparatus before starting to provide the new service, tests the new service in accordance with a test instruction from the external apparatus and transmits a test result to the external apparatus, and starts to provide the new service if determination information indicating that provision of the new service is permitted is received from the external apparatus. After receiving the identification information from the ECU, the external apparatus transmits the test instruction to the ECU, receives the result of the test, determines whether or not to permit provision of a new service based on the received result, and transmits the determination information to the ECU.

Information such as a service ID, a version, and the like is set for a service that is provided by a server in accordance with SOME/IP. A client that desires a service to be provided designates a service ID and a version, and performs a search to determine whether or not the service is being provided. When, for example, a server program for providing a service has been subjected to a version upgrade, while a client program has not been subjected to a version upgrade, the version of the service that is provided by the server and the version of the service desired by the client do not match, and a situation can arise where the client cannot receive the desired service.

The present disclosure has been made in light of such a situation, and an object of the present disclosure is to provide an in-vehicle information processing apparatus, an information processing method, and a client program with which it is possible to expect that a situation where a client cannot receive a service due to a version mismatch will be avoided whenever possible.

SUMMARY

An in-vehicle information processing apparatus according to one aspect of the present disclosure is an in-vehicle information processing apparatus that includes a client processing unit configured to be provided with a service and perform processing, the client processing unit receives, from a server processing unit configured to provide a service, a service providing message that includes identification information and version information of a service to be provided, determines whether or not the version information included in the received service providing message and version information of a service that the client processing unit desires to be provided match, and, if it is determined that the two types of version information do not match, the client processing unit examines whether or not it is possible to receive the service with different version information, and, if it is possible to receive the service with different version information based on an examination result, the client processing unit is provided with the service and performs processing.

The instant disclosure can be realized not only as an apparatus that includes such a characteristic processing unit, but also as a method that includes the characteristic processing as steps, or as a computer program for causing a computer to execute these steps. The present disclosure can also be realized as a semiconductor integrated circuit that realizes some or all of these devices, or as another device or system that includes these devices.

Advantageous Effects

According to the above, it is possible to expect that a situation where a client cannot receive a service due to a version mismatch will be avoided, whenever possible.

DETAILED DESCRIPTION OF PREFERRED EMBODIMENTS

Figure 1:
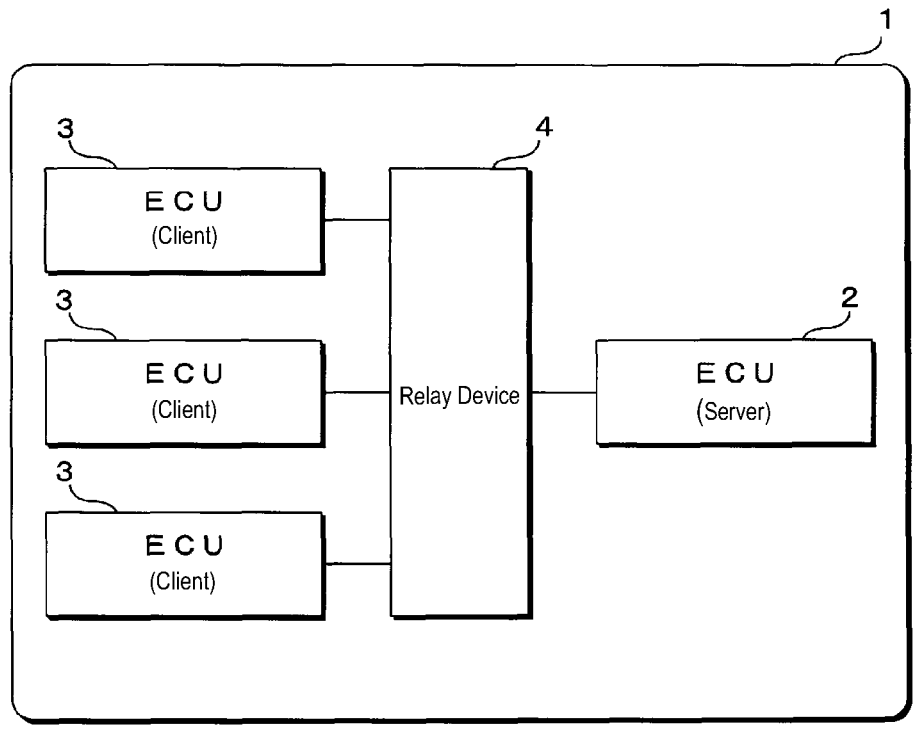
FIG. 1 is a schematic diagram for illustrating the configuration of an in-vehicle information processing system according to an embodiment of the present disclosure.

First, aspects of the present disclosure will be listed and described. At least some of the aspects described below may be discretionarily combined.

First Aspect

An in-vehicle information processing apparatus according to a first aspect of the present disclosure is an in-vehicle information processing apparatus that includes a client processing unit configured to be provided with a service and perform processing, the client processing unit receives, from a server processing unit configured to provide a service, a service providing message that includes identification information and version information of a service to be provided, determines whether or not the version information included in the received service providing message and version information of a service that the client processing unit desires to be provided match, and, if it is determined that the two types of version information do not match, the client processing unit examines whether or not it is possible to receive the service with different version information, and, if it is possible to receive the service with different version information based on an examination result, the client processing unit is provided with the service and performs processing.

In the first aspect, the client processing unit of the in-vehicle information processing apparatus receives the service providing message that includes the identification information and the version information of a service that is provided from the server processing unit, determines whether or not the version information included in the received service providing message and the version information of the service that the client processing unit desires to be provided match. If the two types of version information match, the client processing unit receives the service provided by the server processing unit, and performs processing. If the two types of version information do not match, the client processing unit examines whether or not it is possible to receive the service with different version information. As a result of examination, if it is possible to receive the service with different version information, the client processing unit can receive the service provided by the server processing unit and perform processing. Accordingly, it can be expected that a situation where the client processing unit of the in-vehicle information processing apparatus cannot receive a service due to a version mismatch will be avoided whenever possible.

Second Aspect

In a second aspect, if, based on the examination result, it is possible to receive the service with different version information, the client processing unit changes version information of a service that the client processing unit desires to be provided from this point on to the version information included in the service providing message.

In the second aspect, as a result of examination, if it is possible to receive the service with different version information, the client processing unit changes version information of a service that the client processing unit desires to be provided to the version information included in the service providing message received from the server processing unit. Accordingly, a mismatch of version information will not occur from this point on, and it can be expected that the client processing unit will perform processing smoothly.

Third Aspect

In a third aspect, the client processing unit temporarily changes the version information of the service that the client processing unit desires to be provided to the version information included in the service providing message, transmits/receives a message to/from the server processing unit based on the temporarily changed version information, and performs examination as to whether or not it is possible to receive the service with different version information based on a result of the transmitted/received message.

In the third aspect, when performing examination as to whether or not it is possible to receive the service with different version information, the client processing unit first temporarily changes the version information of the service that the client processing unit desires to be provided to the version information included in the service providing message received from server processing unit. The client processing unit then transmits/receives a message related to provision of the service to/from the server processing unit based on the changed version information. The client processing unit performs examination as to whether or not it is possible to receive the service with different version information, based on a result of the transmitted/received message. Accordingly, the in-vehicle information processing apparatus can perform examination as to whether or not a failure will occur, etc., when the version information of the service that the client processing unit requests is changed to the version information of the server that the server processing unit can provide.

Fourth Aspect

In a fourth aspect, a storage unit configured to store examination information in which content of a message that is transmitted when the client processing unit performs examination and content of a message that is received from the server processing unit in response to the message are associated with each other is provided.

In the fourth aspect, the in-vehicle information processing apparatus stores, in the storage unit, examination information in which the content of a message that the client processing unit transmits to the server processing unit at the time of examination and the content of a message that is received from the server processing unit in response to this message are associated with each other. Accordingly, the client processing unit transmits a message and determines whether or not a received message is correct, in accordance with the stored examination information, and can perform examination.

Fifth Aspect

In a fifth aspect, the client processing unit transmits a search message for searching for the service that the client processing unit desires to be provided, to the server processing unit, and receives the service providing message transmitted by the server processing unit as a response to the search message.

In the fifth aspect, the client processing unit of the in-vehicle information processing apparatus transmits a search message for searching for the service that the client processing unit desires to be provided, and receives a service providing message that the server processing unit transmits as a response to this search message. Accordingly, when a service providing message from the server processing unit is required, the client processing unit can transmit a search message and receive a service providing message.

Sixth Aspect

In a sixth aspect, if it is not possible to receive the service with different version information based on the examination result, the client processing unit searches for another server processing unit capable of providing the service that the client processing unit desires to be provided.

In the sixth aspect, if it is not possible to be provided with the service with different version information as a result of the examination, the client processing unit searches for another server processing unit that can provide the desired service. Accordingly, there is the possibility that the client processing unit can receive a required service from another server processing unit.

Seventh Aspect

In a seventh aspect, the client processing unit transmits the search message after the client processing unit is started.

In the seventh aspect, after the client processing unit is started or restarted, the client processing unit transmits the search message. Accordingly, after being started or restarted, the client processing unit of the in-vehicle information processing apparatus can promptly search for a server processing unit from which a required service can be received.

Eighth Aspect

In an eighth aspect, the client processing unit transmits/receives a message to/from another apparatus that includes the server processing unit.

In the eighth aspect, the client processing unit of the in-vehicle information processing apparatus transmits/receives a message to/from another apparatus that includes the server processing unit. Accordingly, the in-vehicle information processing apparatus can perform processing that uses a service provided by the other apparatus.

Ninth Aspect

In a ninth aspect, a server processing unit is provided.

In the ninth aspect, the in-vehicle information processing apparatus that includes the client processing unit further includes the server processing unit. Accordingly, the in-vehicle information processing apparatus can perform processing that is performed internally using a method similar to a method for being provided with a service from an external apparatus.

Tenth Aspect

An information processing method according to a tenth aspect of the present disclosure is an information processing method in which a client processing unit of an in-vehicle information processing apparatus is provided with a service from a server processing unit and performs processing, the method including: receiving a service providing message that includes identification information and version information of a service to be provided, from the server processing unit, determining whether or not the version information included in the received service providing message and version information of a service that the client processing unit desires to be provided match, and, if it is determined that the two types of version information do not match, examining whether or not it is possible to receive the service with different version information, and, if it is possible to receive the service with different version information based on an examination result, the client processing unit receives the service and performs processing.

In the tenth aspect, similarly to the first aspect, it is possible to expect that a situation where a service cannot be received due to a version mismatch will be avoided.

Eleventh Aspect

A client program according to an eleventh aspect of the present disclosure causes an information processing apparatus mounted in a vehicle to perform processing for receiving, from a server program providing a service, a service providing message that includes identification information and version information of a service to be provided, determining whether or not the version information included in the received service providing message and version information of a service that the client program desires to be provided match, and, if it is determined that the two types of version information do not match, examining whether or not it is possible to receive the service with different version information, and, if it is possible to receive the service with different version information based on an examination result, receiving the service.

In an eleventh aspect, similarly to the first aspect, it is possible to expect that a situation where a service cannot be received due to a version mismatch will be avoided whenever possible.

Specific examples of an in-vehicle information processing system according to embodiments of the present disclosure will be described below with reference to the drawings. The present disclosure is not restricted to these illustrative examples and is defined by the claims, and all changes that come within the meaning and range of equivalency of the claims are intended to be embraced therein.

System Configuration

FIG. 1 is a schematic diagram for illustrating the configuration of an in-vehicle information processing system according to an embodiment of the present disclosure. The in-vehicle information processing system according to the present embodiment is a system that performs various types of information processing related to travelling control and the like of a vehicle 1 as a result of a plurality of ECUs 2 and 3 mounted in the vehicle 1 performing communication via a relay device 4, and cooperating with each other. The in-vehicle information processing system shown in FIG. 1 has a star network configuration in which one ECU 2 and three ECUs 3 are connected to one relay device 4 via individual communication lines. Note that the number of apparatuses included in the in-vehicle information processing system, the network configuration, and the like are exemplary, and there is no limitation thereto. The total number of ECUs 2 and 3 included in the in-vehicle information processing system may also be three or less, or five or more. In addition, a plurality of ECUs 2 and 3 may be connected in a bus network configuration, a ring network configuration or the like.

The ECUs 2 and 3 are information processing apparatuses mounted in the vehicle 1. The ECUs 2 and 3 may include various ECUs such as an ECU that controls automated driving of the vehicle 1, an ECU that controls the operation of the engine, an ECU that controls the locking and unlocking of a door, an ECU that turns a light on and off, an ECU that controls the operation of an airbag, and an ECU that controls the operation of the ABS (Antilock Brake System). Note that, in the present embodiment, an in-vehicle information processing apparatus is one of the ECUs 2 and 3, but there is no limitation thereto, and an in-vehicle information processing apparatus may be various apparatuses other than the ECUs 2 and 3.

The relay device 4 is a device that includes a plurality of ports for connecting communication lines, and relays messages transmitted/received between communication lines connected to these ports. The relay device 4 is a device such as a switching hub or a gateway, for example. The relay device 4 transmits a message received on one communication line, from another communication line, and thereby relays transmission/receiving of the message. Note that, for example, if a bus network configuration in which the plurality of ECUs 2 and 3 are connected to a common communication line is adopted, the in-vehicle information processing system does not need to include the relay device 4.

In the in-vehicle information processing system according to the present embodiment, messages are transmitted/received between the ECUs 2 and 3 in accordance with a SOME/IP communication standard. The SOME/IP standard is a standard classified as a fifth layer or a higher layer of the OSI reference model, and communication is performed in a mode of a request for a service or a response to the request, which are transmitted between application programs. In the present embodiment, the ECU 2 is an apparatus on the server side that provides a service, and an ECU 3 is an apparatus on the client side that is provided with a service. Note that this relation between a client and a server is exemplary, and each of the ECUs 2 and 3 can be a client or a server. Note that any standard may be adopted for communication on a fourth layer or a lower layer of the OSI reference model, and, for example, a standard of Ethernet (registered trademark), TCP (Transmission Control Protocol), UDP (User Datagram Protocol), or the like can be adopted.

Figure 2:
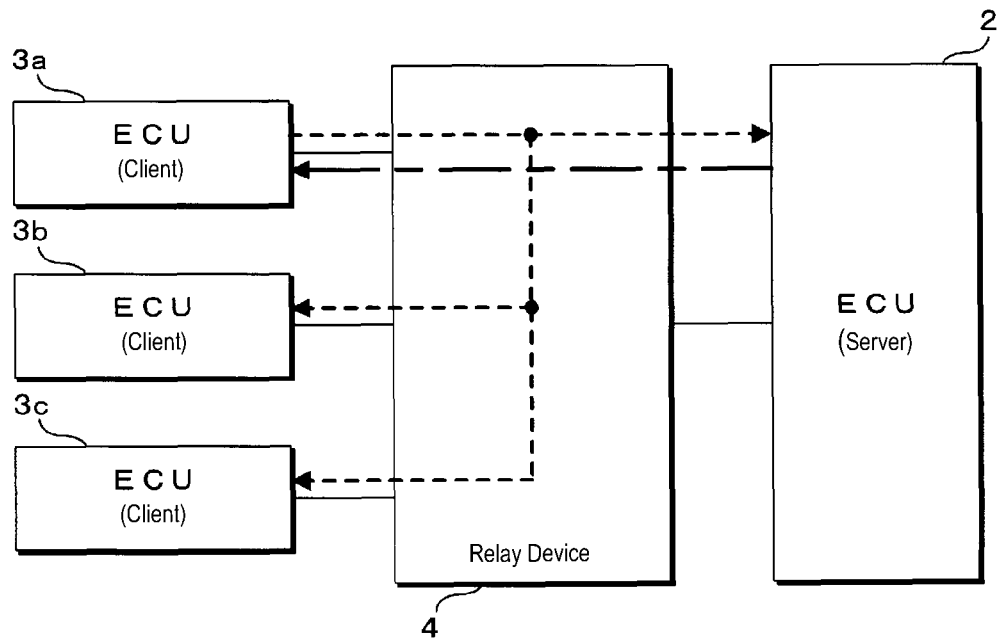
FIG. 2 is a schematic diagram for illustrating communication performed in an in-vehicle information processing system according to an embodiment of the present disclosure.
Figure 3:
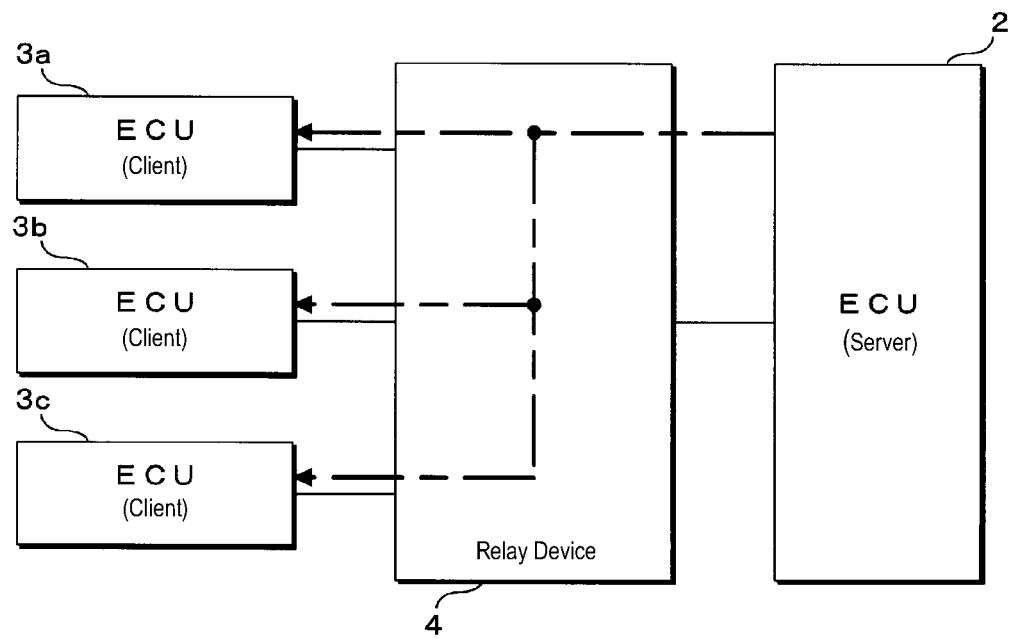
FIG. 3 is a schematic diagram for illustrating communication performed in an in-vehicle information processing system according to an embodiment of the present disclosure.

FIGS. 2 and 3 are schematic diagrams for illustrating communication performed in the in-vehicle information processing system according to the present embodiment. In FIGS. 2 and 3, the three ECUs 3 are respectively given different reference signs, namely 3a, 3b, and 3c in order to distinguish them from one another. As shown in FIG. 2, for example, the ECU 3a transmits a search message (search frame) for searching for a service that the ECU 3a needs, at a predetermined timing such as after startup or restart. In the present embodiment, the ECU 3a transmits a search message using a transmission method for simultaneously transmitting one message to a plurality of apparatuses, that is, so-called multicasting. Accordingly, the search message transmitted by the ECU 3a is received by the ECUs 2, 3b, and 3c (in FIG. 2, transmission/receiving of a search message is indicated by broken line arrows).

The search message transmitted by the ECU 3a includes a service ID for identifying the service that the ECU 3a needs and a service version for identifying the version of software (server program) providing this service. The ECUs 2, 3b, and 3c that have received the search message determine whether or not it is possible to provide a service whose service ID and service version match the service ID and the service version included in the received search message. In this example, the ECU 2 can provide such a service, and the ECU 2 transmits a service providing message (service provision frame) indicating that a service can be provided, to the ECU 3a that transmitted the search message. At this time, the ECU 2 transmits a service providing message using a transmission method in which a message is transmitted to one ECU, namely the ECU 3a, through so-called unicasting (In FIG. 2, transmission/receiving of a service providing message is indicated by dashed-dotted line arrows).

The ECU 3a that receives the service providing message transmitted from the ECU 2 can determine, based on the service providing message, that there is an apparatus that can provide a service, and that the apparatus is the ECU 2. The service providing message includes information such as a service ID and a service version and information such as the IP address and the port number of the server (the ECU 2) that can provide the service. From this point on, the ECU 3a transmits, to the ECU 2, a request to provide information regarding this service and the like, and, in response to this request, the ECU 2 transmits a response that includes information regarding the service, to the ECU 3a. Accordingly, the service is provided by the ECU 2 serving as a server, to the ECU 3a serving as a client, and the ECU 3a can perform various types of information processing that uses the service provided by the ECU 2.

In addition, in the present embodiment, a service providing message is not only transmitted as a response to a search message, but is also transmitted autonomically in a predetermined cycle by the ECU 2 that provides a service. The ECU 2 that can provide a service repeatedly transmits a service providing message that includes information regarding the service that the ECU 2 provides, in a predetermined cycle, for example, about several milliseconds to several seconds. As shown in FIG. 3, when periodically transmitting a service providing message, the ECU 2 performs transmission using a transmission method for simultaneously transmitting one service providing message to a plurality of apparatuses, through so-called multicasting. Accordingly, a service providing message transmitted by the ECU 2 is received by the ECUs 3a, 3b, and 3c (in FIG. 3, transmission/receiving of a service providing message is indicated by dashed-dotted line arrows).

A service providing message that is transmitted in response to a search message and a service providing message that is periodically transmitted may be the same, and the ECU 3a that receives these messages can become aware that, as described above, the ECU 2 provides a service that the ECU 3a needs, and can transmit a request related to the service to the ECU 2 from this point on. Upon receiving a service providing message that is periodically transmitted, the ECUs 3b and 3c that do not need the service may discard (ignore) this message.

In this manner, in the in-vehicle information processing system according to the present embodiment, the ECU 3a on the client side that requires a service needs to be aware of the ECU 2 that provides the required service, based on a service providing message in advance. After it is found that the ECU 2 provides the service, the ECU 3a transmits/receives messages to/from the ECU 2, and can be provided with the service from the ECU 2 and perform information processing. The ECU 3a transmits a request message for requesting that the service be provided, to the ECU 2, and, as a response to this request message, the ECU 2 transmits a response message to the ECU 3a.

Note that, in the present embodiment, a service that is provided by the ECU 2 serving as a server can be processing for providing information that the ECU 2 has, for example, processing for transmitting a message that includes various types of information such as the vehicle speed of the vehicle 1 or a detection result of an object near the vehicle 1, to the ECU 3a that has made the request. In addition, for example, assuming that the ECU 2 is an apparatus that controls an in-vehicle device such as a light, a lock of a door/a door lock, or the like of the vehicle 1, the ECU 2 can provide a service for controlling such an in-vehicle device in response to a request from the ECU 3a. A service that is provided by the ECU 2 serving as a server is not limited to those described above, and may be various types of processing.

Here, the ECUs 2 and 3a to 3c included in the in-vehicle information processing system can be subjected to a version upgrade as a result of software thereof being updated. A version upgrade may be performed on all of the apparatuses in the in-vehicle information processing system at a time, but may also be performed individually on each apparatus. Therefore, for example, a situation may arise where software for providing a service through the ECU 2 undergoes a version upgrade, and the ECU 3a that is to be provided with this service is not subjected to a version upgrade. In such a situation, even if the ECU 3a transmits a search message in which a service is designated in an old version, the ECU 2 that receives this message does not transmit a service providing message to the ECU 3a since the version of the service provided by the ECU 2 and the version of the designated service are different, and the ECU 3a cannot receive the service. Also, the ECU 2 periodically transmits a service providing message in which a service is designated in a new version, but the ECU 3a that receives this message does not transmit a message for requesting a service to the ECU 2 since the version of the service in this message is different from the version of the service that the ECU 3a desires. Accordingly, the service cannot be provided from the ECU 2 to the ECU 3a.

In view of this, in the in-vehicle information processing system according to the present embodiment, when there is a server side ECU 2 that provides a service whose service ID is the same as that of a service that the client side ECU 3a desires to be provided and which is of a different service version, the ECU 3a examines whether or not it is possible to receive this service. As a result of the examination, if it is determined that it is possible to receive the service of a different service version, the ECU 3a can perform processing using the service provided by the ECU 2.

Apparatus Configuration

Figure 4:
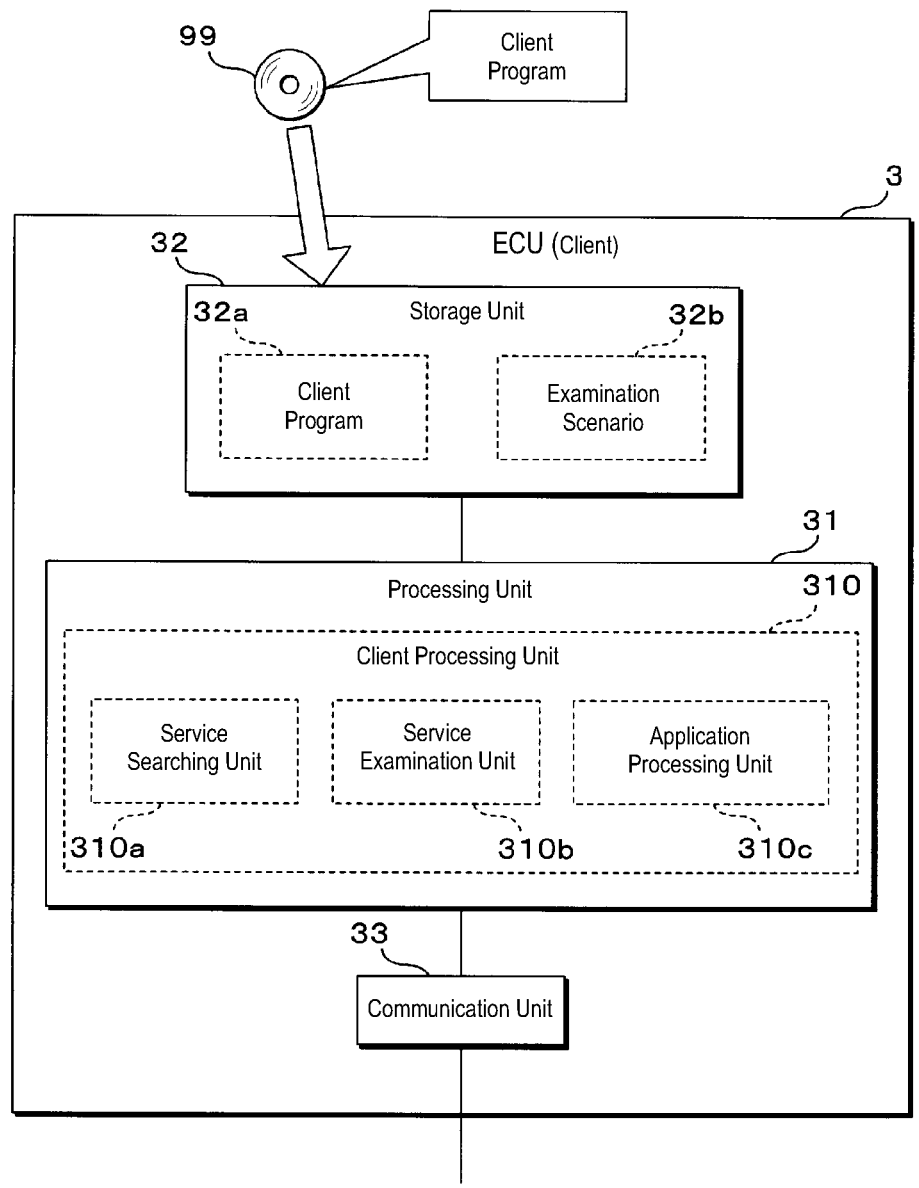
FIG. 4 is a block diagram showing the configuration of an ECU on a client side according to an embodiment of the present disclosure.

FIG. 4 is a block diagram showing the configuration of an ECU 3 on the client side according to the present embodiment. The ECU 3 according to the present embodiment is constituted by a processing unit (processor) 31, a storage unit (storage) 32, a communication unit (transceiver) 33, and the like. The processing unit 31 is constituted by using a computation processing apparatus such as a CPU (Central Processing Unit) or an MPU (Micro-Processing Unit). The processing unit 31 can perform various types of processing such as processing for searching for a server that provides a required service and information processing that is based on a service provided by a server, by reading out and executing a client program 32a stored in the storage unit 32.

The storage unit 32 is constituted by using a nonvolatile memory device such as a flash memory or an EEPROM (Electrically Erasable Programmable Read-Only Memory). The storage unit 32 stores various programs that are executed by the processing unit 31, and various types of data necessary for processing performed by the processing unit 31. In the present embodiment, the storage unit 32 stores the client program 32a that is executed by the processing unit 31, and an examination scenario 32b for examining a service that the server provides.

The client program 32a may be written in the storage unit 32 at a manufacturing stage of the ECU 3, for example. Also, for example, the client program 32a may be distributed by a remote server apparatus or the like, obtained by the ECU 3 through communication with the server apparatus, and written in the storage unit 32. Moreover, the client program 32a recorded on a recording medium 99 such as a memory card or an optical disk may be read out by the ECU 3 and stored in the storage unit 32. Moreover, for example, the client program 32a recorded on the recording medium 99 may be read out by a writing apparatus and written in the storage unit 32 of the ECU 3. The client program 32a may also be provided in a mode of being distributed via a network, or in a mode of being recorded on the recording medium 99.

The examination scenario 32b is a collection of test patterns for examining, when there is a server that provides a service of a service version different from the service version of a service that the ECU 3 needs, whether or not the service that is provided by this server can be used. The examination scenario 32b stores a plurality of combinations of a service request message that is transmitted to a server, and a condition for determining whether or not information included in a response message to this request message from the server is proper. As conditions, settings such as a predetermined value for determining a match with a value included in a response message and a range for determining that this value is proper can be stored. The examination scenario 32b is information created by a designer or the like in advance in a designing stage or the like of the in-vehicle information processing system or the ECU 3 according to the present embodiment. The examination scenario 32b is provided, for example, along with the client program 32a via the recording medium 99, a network, or the like, and is obtained by the ECU 3 and stored in the storage unit 32. Note that the examination scenario 32b may be provided separately from the client program 32a.

The communication unit 33 is connected to a communication line disposed in the vehicle 1, and transmits/receives messages to/from the other ECUs 2 and 3 via this communication line. In the present embodiment, the communication unit 33 transmits/receives messages in accordance with an Ethernet communication standard, for example. The communication unit 33 can be constituted by using an IC (Integrated Circuit) of Ethernet PHY (physical layer) or the like. Note that the communication standard that is used by the communication unit 33 is not limited to Ethernet, and various communication standards such as those of a CAN (Controller Area Network), FlexRay, and the like can also be used. The communication unit 33 transmits messages by outputting data provided from the processing unit 31, as an electrical signal to the communication line. Also, the communication unit 33 samples and obtains the potential of the communication line, thereby converting an electrical signal on the communication line into digital data, and providing the resultant data as a received message to the processing unit 31.

In addition, in the ECU 3 according to the present embodiment, a client processing unit 310 is realized as a software-like function unit by the processing unit 31 reading out and executing the client program 32a stored in the storage unit 32. The client processing unit 310 performs various types of processing as a client that is provided with a service, in accordance with the SOME/IP standard. In the present embodiment, the client processing unit 310 includes a service searching unit 310a, a service examination unit 310b, an application processing unit 310c, and the like.

The service searching unit 310a performs processing for searching for a server that provides a service required for processing performed by the client processing unit 310. The service searching unit 310a transmits a search message in which the service ID and the service version of the service required for the processing that is performed by the client processing unit 310 are designated, from the communication unit 33 through multicasting. The service searching unit 310a receives a service providing message transmitted from a server in response to the search message transmitted by the service searching unit 310a, and obtains information such as the IP address and the port number included in the received service providing message, thereby determining whether or not there is a server that provides the service, and obtaining information required for communication with the server. Also, the service searching unit 310a receives a service providing message that is periodically transmitted by the server, and obtains information such as the IP address and the port number included in the received service providing message, thereby determining whether or not there is a server that provides the service, and obtaining information required for communication with the server.

When a service whose service ID matches the service ID of a service that the client processing unit 310 needs, and whose service version is different is provided, the service examination unit 310b performs processing for examining whether or not it is possible to receive this service of a different service version. The service examination unit 310b transmits a predetermined request message to the server that provides the service of a different service version, in accordance with the examination scenario 32b in the storage unit 32. The request message includes information such as the service ID and the service version of the service requested by the client processing unit 310. At this time, the service examination unit 310b temporarily changes the service version of the service that the client processing unit 310 requests, to the service version of the service that the examination target provides, and transmits the request message. Accordingly, the server that receives the request message performs processing for providing a service with the service ID and service version included in the request message, and transmits a response message that includes a processing result to the ECU 3 that requested the service.

The service examination unit 310b receives the response message in response to the request message, and examines whether or not it is possible to receive the service by determining whether or not information included in the received response message is expected information, whether or not the information is proper, and the like. If a value included in the information included in the response message matches a predetermined value, if the value is within a normal range, or the like, the service examination unit 310b determines that it is possible to receive the service. In contrast, if the value in the information included in the response message does not match the predetermined value, if the value is outside a normal range, if the response message cannot be received, if the format of the response message is not an envisioned format, or the like, the service examination unit 310b determines that it is not possible to be provided with the service.

The service examination unit 310b transmits a request message and receives a response message a plurality of times in accordance with the examination scenario 32b, and based on a result of the transmission and receiving performed a plurality of times, performs final determination on whether or not it is possible to receive the service. Regarding all of the transmitted request messages and received response messages, for example, if information included in the received response messages is expected information, the service examination unit 310b can make a final determination that it is possible to receive the service. In addition, regarding at least one transmitted request message and received response message, if the information included in the received response message is not expected information, the service examination unit 310b can make a final determination that it is not possible to be provided with the service.

The application processing unit 310c performs information processing related to an application specific to the ECU 3, using a provided service. The application processing unit 310c transmits a request message in which a service ID and a service version are designated, to a server found by the service searching unit 310a, and receives a response message transmitted in response to this request message. The application processing unit 310c obtains information included in the received response message, and performs various types of information processing based on the obtained information. The application processing unit 310c, for example, transmits a request message requesting the server to transmit information regarding the vehicle speed of the vehicle 1, obtains information regarding the vehicle speed included in a response message received from the server in response to this request message, and can perform various types of information processing that uses the vehicle speed. Information processing that is performed by the application processing unit 310c using a service provided from a server may be any kind of processing.

Note that the application processing unit 310c designates a predetermined service version, and transmits a request message, but as described above, if it is determined that it is possible to receive a service of a different service version, the application processing unit 310c changes the service version of the requested service to the service version of the service that the server provides. From this point on, the application processing unit 310c transmits a request message to the server using the changed service version.

Figures 5, 6:
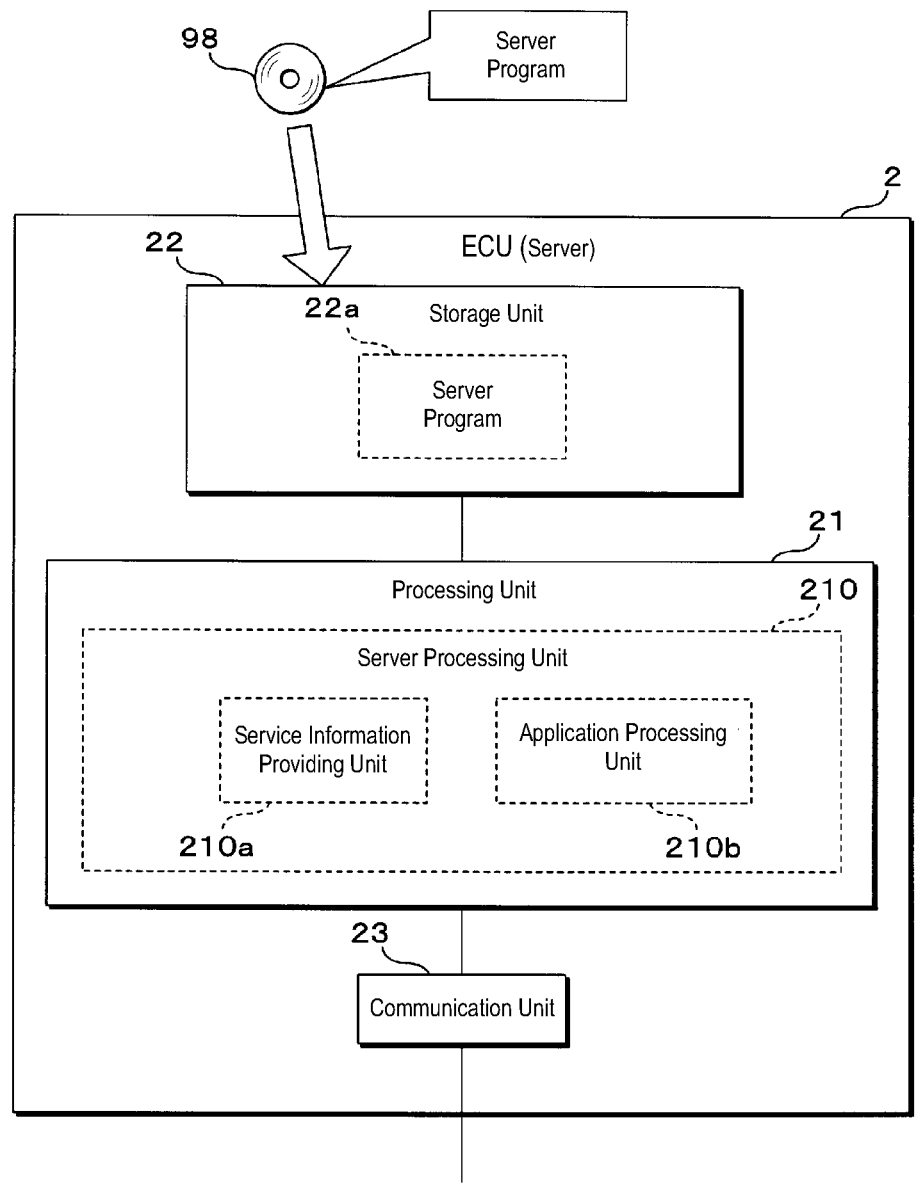
FIG. 5 is a block diagram showing the configuration of an ECU on a server side according to an embodiment of the present disclosure.
FIG. 6 is a schematic diagram showing a configuration example of a search message and a service providing message transmitted/received in an in-vehicle information processing system according to an embodiment of the present disclosure.

FIG. 5 is a block diagram showing the configuration of the ECU 2 on the server side according to the present embodiment. The ECU 2 according to the present embodiment is constituted by a processing unit (processor) 21, a storage unit (storage) 22, a communication unit (transceiver) 23, and the like. The processing unit 21 is constituted by using a computation processing apparatus such as a CPU or an MPU. The processing unit 21 can perform various types of processing such as processing for performing notification of a service that is to be provided in response to a search for a service and processing for providing a service to a client, by reading out and executing a server program 22a stored in the storage unit 22.

The storage unit 22 is constituted by using a nonvolatile memory device such as a flash memory or an EEPROM. The storage unit 22 stores various programs executed by the processing unit 21 and various data required for processing that is performed by the processing unit 21. In the present embodiment, the storage unit 22 stores the server program 22a executed by the processing unit 21.

The server program 22a may be written in the storage unit 22 in a manufacturing stage of the ECU 2, for example. Also, for example, the server program 22a may be distributed by a remote server apparatus or the like, obtained by the ECU 2 through communication with the server apparatus, and written in the storage unit 22. Moreover, the server program 22a recorded on a recording medium 98 such as a memory card or an optical disk may be read out by the ECU 2 and stored in the storage unit 22. Moreover, for example, the server program 22a recorded on the recording medium 98 may be read out by a writing apparatus and written in the storage unit 22 of the ECU 2. The server program 22a may also be provided in a mode of being distributed via a network, or in a mode of being recorded on the recording medium 98.

The communication unit 23 is connected to a communication line disposed in the vehicle 1, and transmits/receives messages to/from another ECU 3 via this communication line. In the present embodiment, the communication unit 23 transmits/receives messages in accordance with the Ethernet communication standard, for example. The communication unit 23 can be constituted by using an IC of an Ethernet PHY or the like. Note that the communication standard that is used by the communication unit 23 is not limited to Ethernet, and various communication standards such as those of a CAN, FlexRay, and the like can also be used. The communication unit 23 transmits messages by outputting data provided from the processing unit 21 as an electrical signal to the communication line. Also, the communication unit 23 samples and obtains the potential of the communication line, thereby converting an electrical signal on the communication line into digital data, and providing the resultant data as a received message to the processing unit 21.

In addition, in the ECU 2 according to the present embodiment, a server processing unit 210 is realized as a software-like function unit by the processing unit 21 reading out and executing the server program 22a stored in the storage unit 22. The server processing unit 210 performs various types of processing as a server that provides a service, in accordance with the SOME/IP standard. In the present embodiment, the server processing unit 210 includes a service information providing unit 210a, an application processing unit 210b, and the like.

The service information providing unit 210a performs processing for transmitting a service providing message that includes information regarding a service that the ECU 2 provides. When a search message from a client is received, the service information providing unit 210a determines whether or not the service ID and the service version included in this search message respectively match the service ID and the service version of the service that the ECU 2 provides. If the service IDs and the service versions match, the service information providing unit 210a transmits a service providing message to the client that transmitted the search message, through unicasting. In addition, the service information providing unit 210a transmits a service providing message that includes information regarding the service that the ECU 2 provides, in a predetermined cycle through multicasting.

The application processing unit 210b performs information processing for providing a service specific to the ECU 2. The application processing unit 210b receives a request message from an ECU 3 serving as a client, and obtains the service ID and the service version included in the received request message. The application processing unit 210b performs information processing for providing a service corresponding to the obtained service ID and service version. The application processing unit 210b generates a response message that includes information obtained as a result of the information processing, and transmits the response message to the client that transmitted the request message.

Processing Performed by Client and Server

FIG. 6 is a schematic diagram showing a configuration example of a search message and a service providing message transmitted/received in the in-vehicle information processing system according to the present embodiment. A search message that an ECU 3 serving as a client according to the present embodiment transmits and a service providing message that the ECU 2 serving as a server transmits may include information such as header information, a message type, a service ID, a service version, and option information.

The header information of a message is an Ethernet header, an IP header, a TCP/UDP header, a SOME/IP header, or the like, and is for storing information defined in accordance with the communication standard. The header information can store information such as a MAC address, an Ethernet type, an IP address, and a port number. The format of the header information may be any format, and information stored in the header information may be any information.

The "message type" stores information indicating whether this message is a search message or a service providing message. The message is a search message if "0" is set in the "message type", and is a service providing message if "1" is set, for example.

The service ID is identification information that is uniquely assigned to a service that the server provides. The service version is information for identifying the version of the service that is provided, and is the version of the software that is operated by the server in order to provide the service identified by the service ID, for example. In the present embodiment, a larger numerical value of a service version indicates a newer version. The service ID and the service version included in a search message are the service ID and the service version of the service that the client desires to be provided by the server. The service ID and the service version included in a service providing message are the service ID and the service version of a service that the server can provide.

In the present embodiment, the option information is information that is assigned to a service providing message, and includes information such as the IP address and the port number of the server that provides the service. Note that, similarly, information such as the IP address and the port number of a client may also be added to a search message as option information.

In addition, in the present embodiment, messages transmitted/received between a client and a server include a request message and a response message, for example. The request message is a message for the client to make a request to the server to provide a service. The request message can include information indicating request content related to a service such as a request to transmit vehicle speed information, or a control request, a control value, and the like of an in-vehicle device, in addition to the header information, message type, service ID, service version, and option information shown in FIG. 6.

Also, the response message is a message that is transmitted by a server as a response to a request message from a client. The response message can include information regarding a service that the server provides, such as information including vehicle speed requested by the client to be transmitted, or a control result related to a controlled in-vehicle device, in addition to the header information, message type, service ID, service version, and option information shown in FIG. 6.

Figure 7:
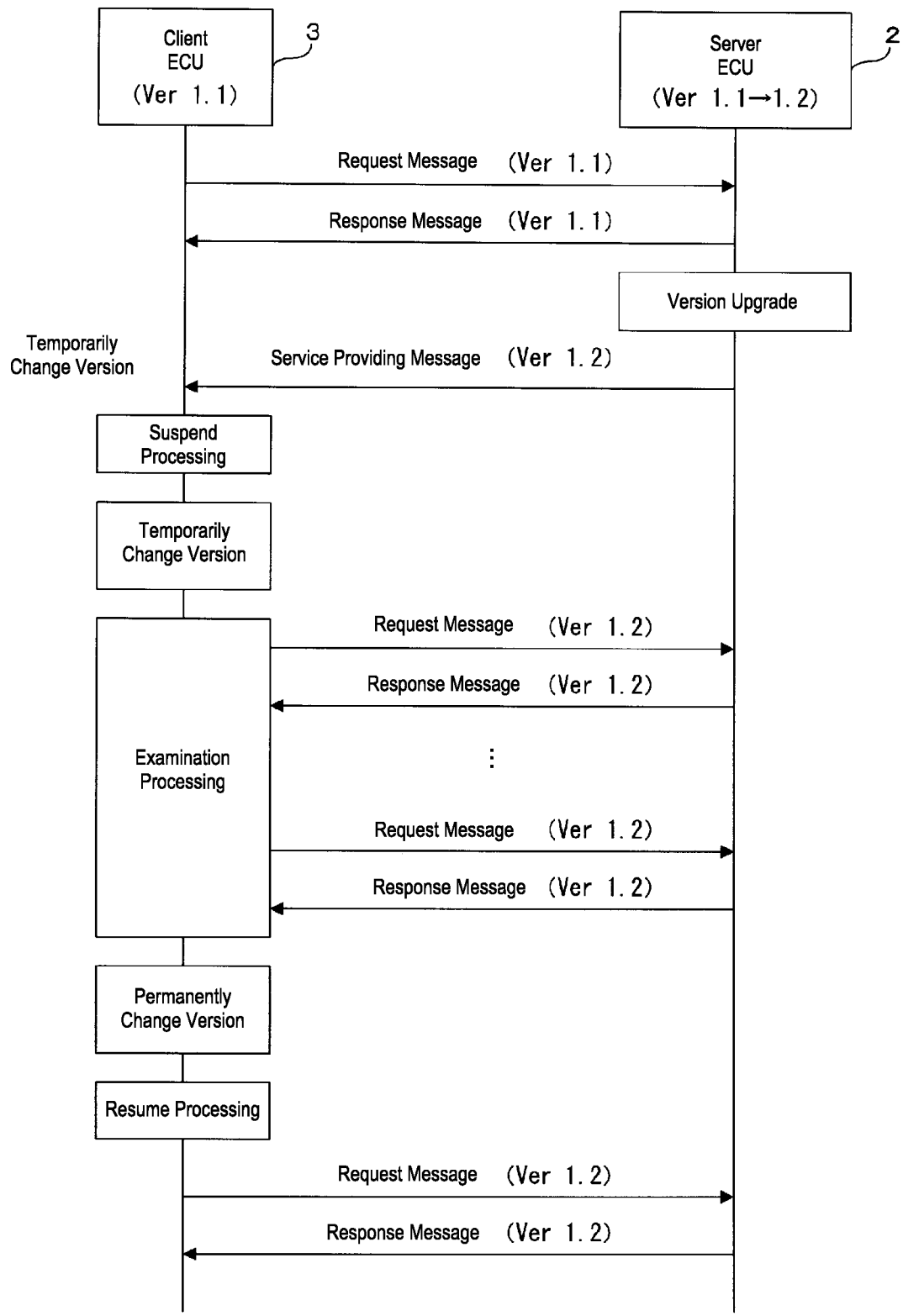
FIG. 7 is a schematic diagram for illustrating an example of processing that is performed in an in-vehicle information processing system according to an embodiment of the present disclosure.

FIG. 7 is a schematic diagram for illustrating an example of processing that is performed in the in-vehicle information processing system according to the present embodiment. FIG. 7 shows an example in which the service version of a service that the ECU 3 serving as a client requests is "1.1", and the service version of a service that the ECU 2 serving as a server provides is upgraded from "1.1" to "1.2". The ECU 3 serving as a client transmits a request message in which the service version is set to "1.1", to the ECU 2 serving as a server. Prior to a version upgrade, upon receiving this request message, the ECU 2 serving as a server carries out information processing for providing a service whose service version is "1.1", and transmits a response message that includes a result of the information processing to the ECU 3 that made the request. The service version in the response message that is transmitted by the ECU 2 at this time is "1.1".

Next, software (the server program 22a) for providing a service of the ECU 2 serving as a server undergoes a version upgrade where the service version is updated from "1.1" to "1.2". The software (the client program 32a) of the ECU 3 serving as a client that uses a service is not subjected to a version upgrade, and the ECU 3 desires to receive the service whose service version is "1.1". In this situation, even if the ECU 3 transmits, to the ECU 2, a request message in which the service version is set to "1.1", the ECU 2 does not transmit a response message to the ECU 3 since the service versions are different.

The server ECU 2 periodically transmits a service providing message. "1.2" is set as the service version in a service providing message that the ECU 2 periodically transmits after a version upgrade. The client ECU 3 that receives this service providing message can recognize that a service whose service ID matches the service ID of a service that the client ECU 3 needs and whose service version is different is provided by the ECU 2.

In view of this, the ECU 3 suspends information processing that uses the service whose service version is "1.1", and temporarily changes the version of the service that it makes a request to the ECU 2 from "1.1" to "1.2". The ECU 3 then starts examination processing for examining whether or not the service whose service version is "1.2" and is provided by the ECU 2 can be used for information processing that is performed by the ECU 3.

The ECU 3 repeatedly transmits a request message and receives a response message in response to the request message in accordance with the examination scenario 32b in the storage unit 32. The ECU 3 transmits, to the ECU 2, a request message that includes request content defined in the examination scenario 32b. "1.2" is set as the service version of the requested service in the request message that is transmitted by the ECU 3 at this time. The ECU 2 that receives the request message in which the service version is "1.2" performs information processing related to the requested service, and transmits a response message to the ECU 3. The ECU 3 that has received the response message determines whether or not information included in the response message is proper, for example, based on whether or not a value included in the information matches a predetermined value, whether or not a value included in the information is within an expected range, or the like. The ECU 3 repeatedly transmits a request message and receives a response message, and makes determinations regarding information included in the response message, and determines that it is possible to use the service whose service version is "1.2" if it is determined that information included in all of the response messages is proper information.

If it is determined in the examination processing that the ECU 3 can use the service whose service version is "1.2", the ECU 3 permanently changes the version of the service for which a request is made to the ECU 2 to "1.2", and resumes the suspended information processing. Thereafter, the service version is set to "1.2" in a request message transmitted by the ECU 3. The ECU 2 receives the request message in which the service version is set to "1.2", performs information processing for providing the service whose service version is "1.2", and transmits a response message in which the service version is set to "1.2", to the ECU 3.

Figure 8:
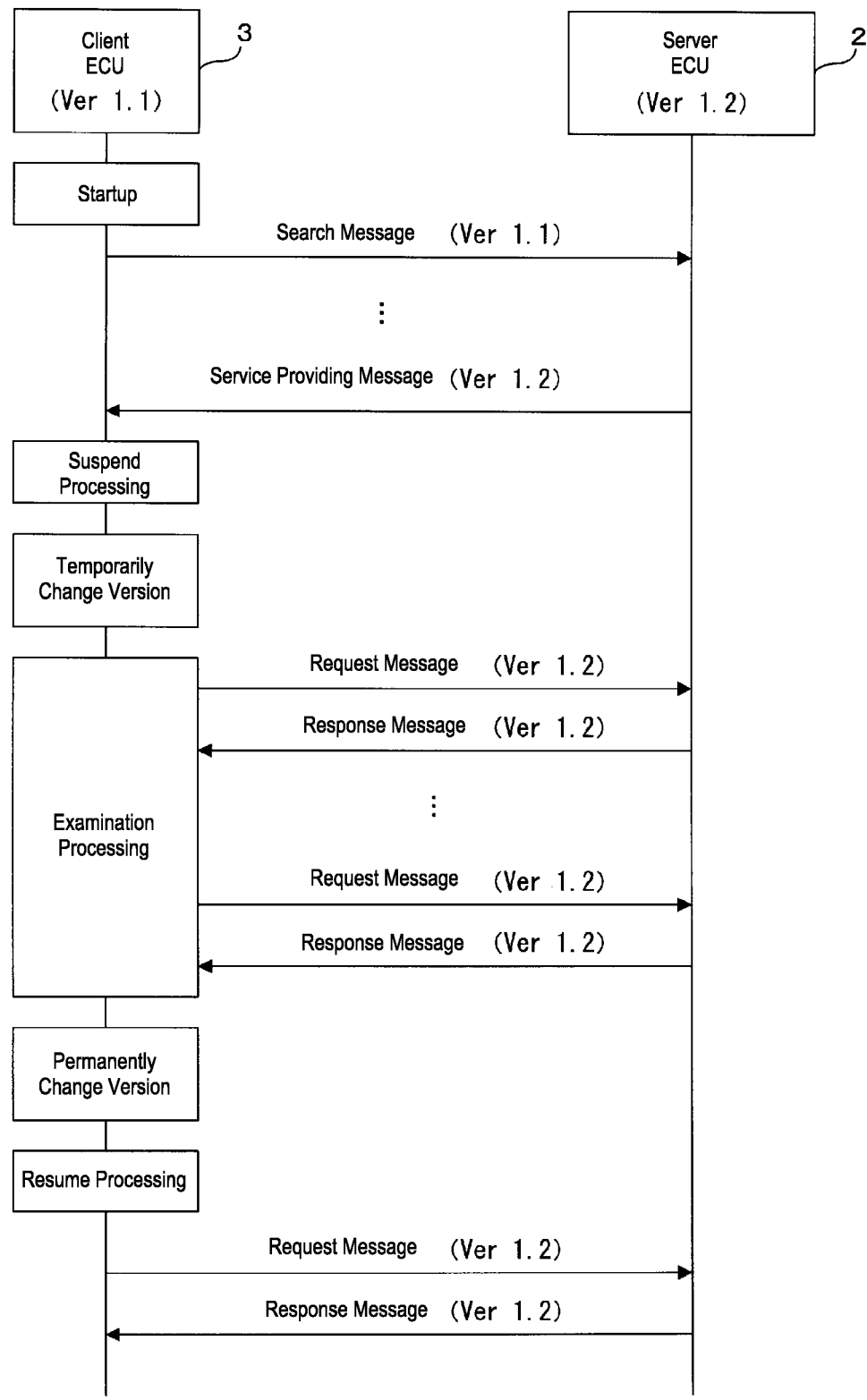
FIG. 8 is a schematic diagram for illustrating an example of processing that is performed in an in-vehicle information processing system according to an embodiment of the present disclosure.

FIG. 8 is a schematic diagram for illustrating an example of processing that is performed in the in-vehicle information processing system according to the present embodiment. FIG. 8 shows an example where the service version of a service that the client ECU 3 requests is "1.1", the service version of a service that the server ECU 2 provides is "1.2", and the client ECU 3 or the client program 32a has just been started (or restarted).

After the client the ECU 3 has been started, or after the client program 32a in the ECU 3 has been started, the ECU 3 transmits, through multicasting, a search message in which the service version is set to "1.1" in order to search for a server that provides a service that the ECU 3 needs. However, since the version of a service that the server ECU 2 provides is "1.2", the ECU 2 that has received this search message does not transmit a service providing message in response to the search message. The ECU 3 cannot find a server that provides a service whose service version is "1.1" that the ECU 3 needs, and cannot perform information processing that uses this service.

The server ECU 2 periodically transmits a service providing message in which the service version is set to "1.2". The client ECU 3 that has received this periodical service providing message can recognize that the ECU 2 provides a service whose service ID matches the service ID of the service that the ECU 3 needs and whose service version is different. In view of this, the ECU 3 suspends information processing that uses the service whose service version is "1.1", temporarily changes the version of the service for which a request is made to the ECU 2, from "1.1" to "1.2", and then starts examination processing for examining whether or not the service whose service version is "1.2" can be used for information processing performed by the ECU 3. The following processing is the same as the processing described with reference to FIG. 7, and thus a description thereof is omitted.

In this manner, if there is no server that provides the service of the service version that the ECU 3 according to the present embodiment needs, and there is a server ECU 2 that provides a service whose service ID matches the service ID of the service that the ECU 3 needs but whose service version is different, the client ECU 3 examines whether or not it is possible to receive this service. As a result of examination, if it is determined that it is possible to receive the service whose service version does not match the service version of the service that the client ECU 3 needs, the ECU 3 changes the service version of the service that the ECU 3 requests, to the service version of the service provided by the ECU 2, and performs subsequent information processing. Note that, as a result of examination, if it is determined that it is not possible to be provided with the service whose service version does not match the service version of the service that the client ECU 3 needs, the ECU 3 may search for another server, and, if there is no server that provides the service that the ECU 3 needs, the ECU 3 may stop information processing that uses this service.

Figure 9:
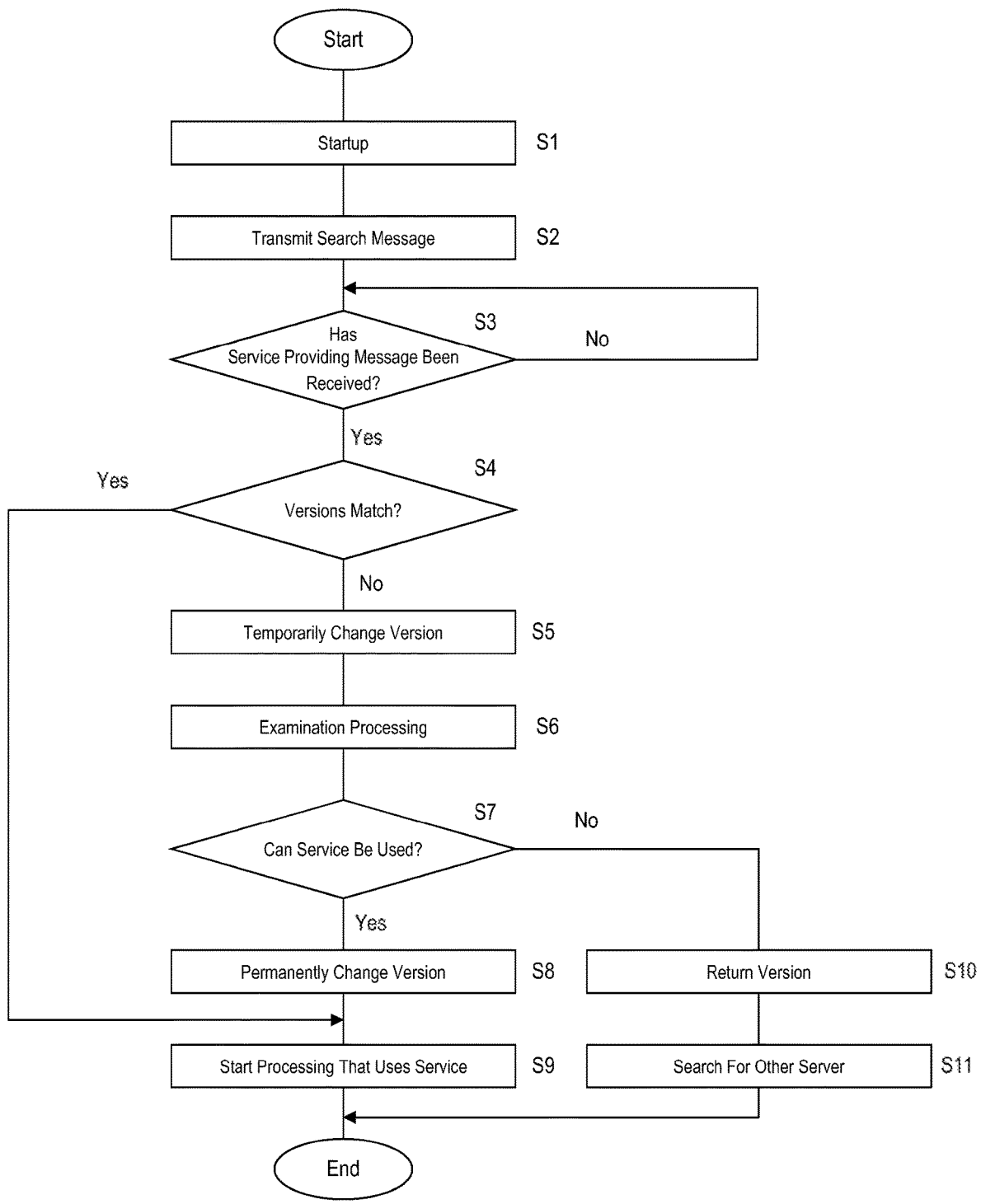
FIG. 9 is a flowchart showing a procedure of processing that is performed by an ECU serving as a client according to an embodiment of the present disclosure.

FIG. 9 is a flowchart showing the procedure of processing that is performed by an ECU 3 serving as a client according to the present embodiment. The ECU 3 according to the present embodiment is started, for example, at a timing when the ignition switch of the vehicle 1 is switched from an off-state to an off-state (step S1). After startup, the service searching unit 310a of the processing unit 31 of the ECU 3 transmits, through multicasting, a search message for searching for a server that can provide a service that the ECU 3 needs (step S2). Next, the service searching unit 310a determines whether or not a service providing message transmitted by the server as a response to the transmitted search message, or a service providing message that the server periodically transmits has been received (step S3). If a service providing message has not been received (step S3: NO), the service searching unit 310a stands by until a service providing message is received.

If service providing messages have been received (step S3: YES), regarding a service providing message for which the service ID matches the service ID of the service that the ECU 3 needs, from among the received service providing messages, the service search unit 310*a* determines whether or not the service version in such a service providing message matches the service version of the service that the ECU 3 needs (step S4). If the two service versions match (step S4: YES), the application processing unit 310*c* of the processing unit 31 starts information processing that uses this service (step S9), and ends the procedure.

If the two service versions do not match (step S4: NO), the service examination unit 310*b* of the processing unit 31 temporarily changes the service version of the service that the ECU 3 requests, to the service version included in the received service providing message (step S5). The service examination unit 310*b* then performs examination processing in accordance with the examination scenario 32*b* of the storage unit 32 (step S6). The service examination unit 310*b* determines whether or not it is possible to use the service of the service version included in the received service providing message, based on a result of examination processing performed in step S6 (step S7).

If it is determined that the service can be used (step S7: YES), the service examination unit 310*b* permanently changes the service version of the service for which a request is made to the server (step S8). The application processing unit 310*c* then starts information processing that uses this service (step S9), and ends the procedure. Also, if it is determined that the service cannot be used (step S7: NO), the service examination unit 310*b* returns the service version changed in step S5 to the original service version (step S10). The service search unit 310*a* then searches for another server that provides the required service (step S11), and ends the procedure.

Figure 10:
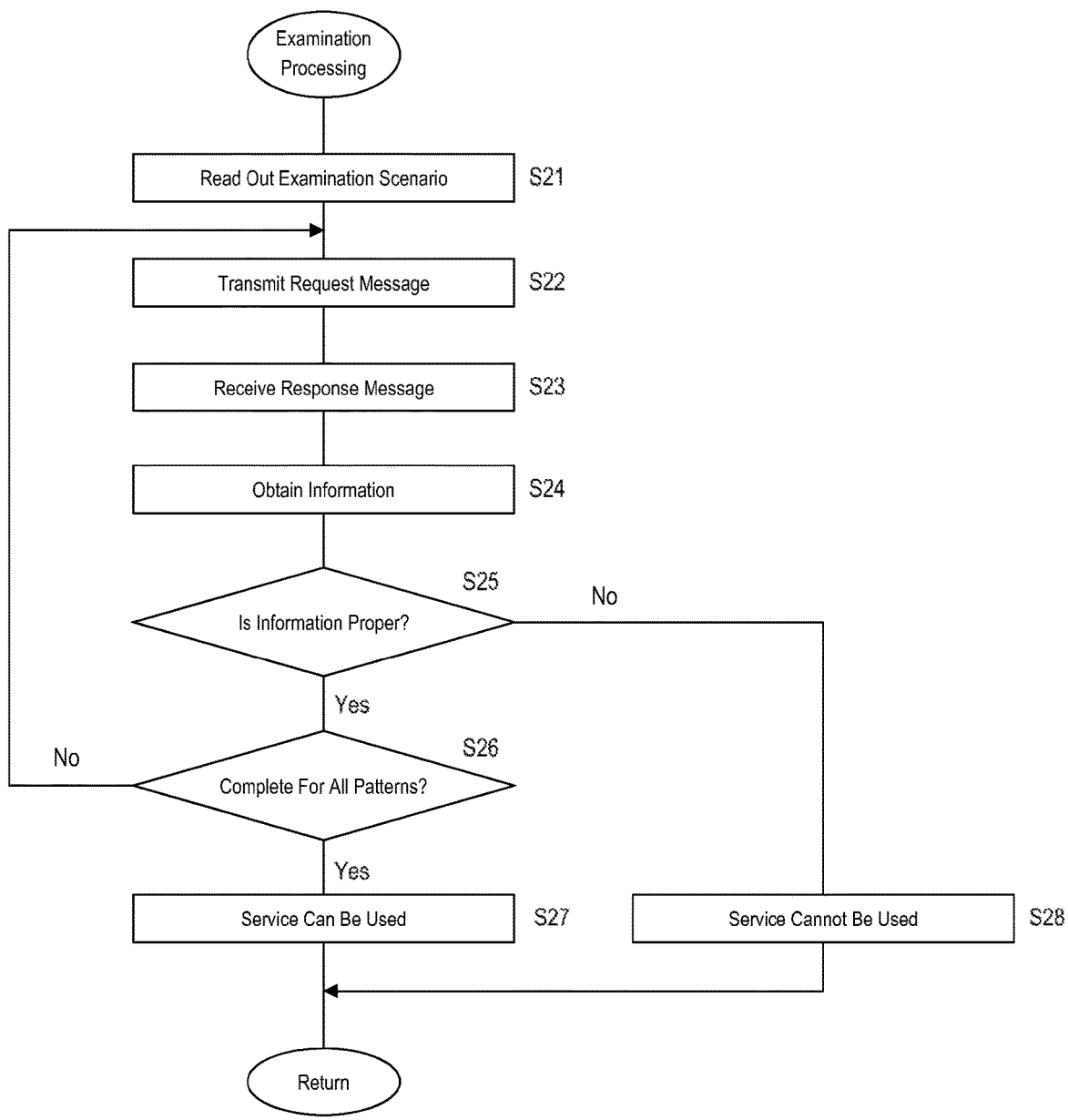
FIG. 10 is a flowchart showing a procedure of examination processing that is performed by an ECU serving as a client according to an embodiment of the present disclosure.

FIG. 10 is a flowchart showing the procedure of examination processing that is performed by the client ECU 3 according to the present embodiment, and shows processing that is performed in step S6 in the flowchart shown in FIG. 9 in detail. The service examination unit 310*b* of the processing unit 31 of the ECU 3 according to the present embodiment reads out the examination scenario 32*b* stored in the storage unit 32 (step S21). The service examination unit 310*b* obtains a request message included as a test pattern in the examination scenario 32*b*, and transmits this request message to the server ECU 2 (step S22). The service examination unit 310*b* receives a response message transmitted by the server in response to the request message (step S23). The service examination unit 310*b* obtains information included in the received response message (step S24).

The service examination unit 310*b* determines whether or not the information obtained in step S24 is proper, based on, for example, whether or not a value in the information matches a predetermined value, whether or not the value is within a predetermined range, or the like (step S25). If the information in the response message is not proper (step S25: NO), the service examination unit 310*b* determines that it is not possible to use this service (step S28), ends the examination processing, and returns the procedure to the flowchart in FIG. 9.

If the information in the response message is proper (step S25: YES), the service examination unit 310*b* determines whether or not examination has been completed in accordance with all of the patterns set in the examination scenario 32*b* (step S26). If examination has not been completed in accordance with all of the patterns (step S26: NO), the service examination unit 310*b* returns the procedure to step S22, and performs examination in accordance with the next pattern. If examination has been completed in accordance with all of the patterns (step S26: YES), the service examination unit 310*b* determines that this service can be used (step S27), ends the examination processing, and returns the procedure to the flowchart in FIG. 9.

Figure 11:
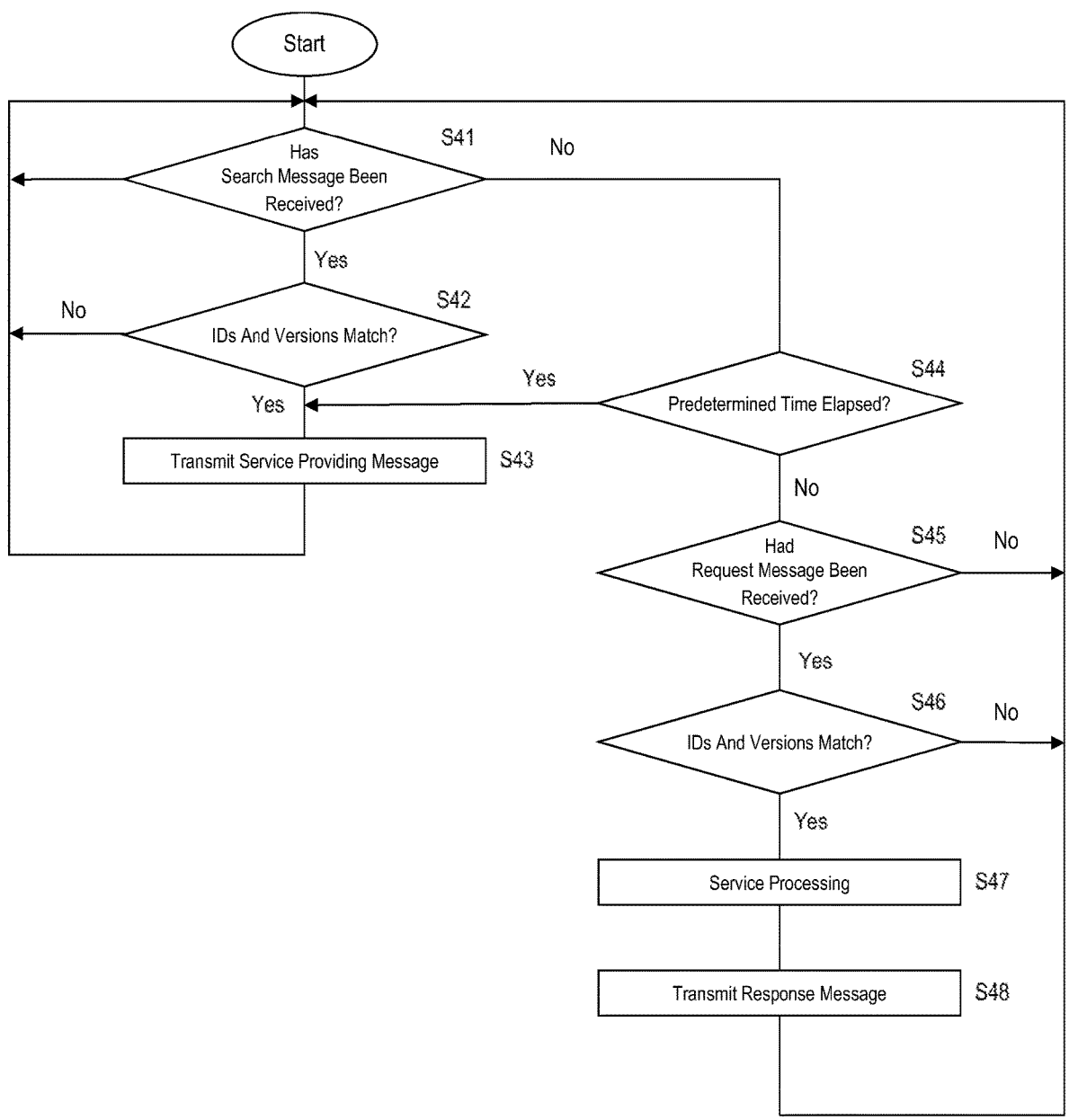
FIG. 11 is a flowchart showing a procedure of processing that is performed by an ECU serving as a server according to an embodiment of the present disclosure.

FIG. 11 is a flowchart showing the procedure of processing that is performed by the ECU 2 serving as a server according to the present embodiment. The service information providing unit 210*a* of the processing unit 21 of the ECU 2 serving as a server according to the present embodiment determines whether or not a search message transmitted by an ECU 3 serving as a client has been received (step S41). If a search message has been received (step S41: YES), the service information providing unit 210*a* determines whether or not the service ID and the service version included in the received search message matches the service ID and the service version of the service that the ECU 2 provides (step S42). If the service IDs and the service versions match (step S42: YES), the service information providing unit 210*a* transmits a service providing message to the ECU 3 that transmitted the search message (step S43), and returns the procedure to step S41. If the service IDs and service versions do not match (step S42: NO), the service information providing unit 210*a* returns the procedure to step S41 without transmitting a service providing message If a search message has not been received (step S41: NO), the service information providing unit 210*a* determines whether or not a predetermined period has elapsed from the previous transmission in periodical transmission of a service providing message (step S44). If the predetermined period has elapsed (step S44: YES), the service information providing unit 210*a* periodically transmits a service providing message (step S43), and returns the procedure to step S41.

If the predetermined period has not elapsed (step S44: NO), the application processing unit 210*b* of the processing unit 21 determines whether or not a request message has been received from the client ECU 3 (step S45). If a request message has not been received (step S45: NO), the application processing unit 210*b* returns the procedure to step S41. If a request message has been received (step S45: YES), the application processing unit 210*b* determines whether or not the service ID and the service version included in the received request message match the service ID and the service version of the service that the ECU 2 provides (step S46). If the service IDs and service versions do not match (step S46: NO), the application processing unit 210*b* returns the procedure to step S41.

If the service IDs and service versions match (step S46: YES), the application processing unit 210*b* performs information processing for providing the requested service, based on the information included in the received request message (step S47). The application processing unit 210*b* transmits a response message that includes information obtained as a result of the information processing, to the ECU 3 that transmitted the request message (step S48), and returns the procedure to step S41.

Overview

The client processing unit 310 of the ECU 3 according to the present embodiment that has the above-described configuration receives a service providing message that includes the service ID and the service version of a service that the server processing unit 210 of the ECU 2 provides, and determines whether or not the service version included in the received request message and the service version of the service that the client processing unit 310 desires to be provided match. If the two service versions match, the client processing unit 310 is provided with the service by the ECU 2, and performs information processing. If the two types of version information do not match, the client processing unit 310 examines whether or not it is possible to receive the service of a different service version. As a result of examination, if it is possible to receive the service of a different service version, the client processing unit 310 can receive the service that the ECU 2 provides, and perform information processing. Accordingly, the client ECU 3 can avoid a situation where a service cannot be received due to a mismatch between service versions, whenever possible.

In addition, as a result of examination, if it is possible to receive the service of a different service version, the client processing unit 310 of the ECU 3 according to the present embodiment permanently changes the service version of the service that the client processing unit 310 desires to be provided from this point on, to the service version included in the service providing message received from the ECU 2. Accordingly, from this point on, a mismatch between service versions will not occur, and the client processing unit 310 can smoothly perform information processing.

In addition, when examining whether or not it is possible to receive the service of a different service version, the client processing unit 310 of the ECU 3 according to the present embodiment first temporarily changes the service version of the service that the client processing unit 310 desires to be provided, to the service version included in the service providing message received from the ECU 2. The client processing unit 310 then transmits/receives a request message and a response message related to the provision of the service to/from the ECU 2, based on the changed service version. The client processing unit 310 examines whether or not it is possible to receive the service of a different service version, based on the result of transmitting/receiving these messages. Accordingly, the client ECU 3 can examine whether or not a failure will occur and the like when the service version of the service that the client ECU 3 requests is changed to the service version of the service that the server ECU 2 can provide.

In addition, the ECU 3 according to the present embodiment stores, in the storage unit 32, the examination scenario 32b in which the content of a request message that is transmitted to the server ECU 2 at the time of examination and the content of a response message that is received from the ECU 2 in response to this request message are associated with each other. Accordingly, the client processing unit 310 can transmit a request message and determine whether or not a received response message is proper, in accordance with the examination scenario 32b stored in the storage unit 32, and can perform examination.

Moreover, the client processing unit 310 of the ECU 3 according to the present embodiment transmits a search message for searching for a service that the client processing unit 310 desires to be provided, and receives a service providing message transmitted by the server ECU 2 as a response to this search message. Accordingly, when a service providing message from the server ECU 2 is required, the client processing unit 310 can transmit a search message and receive a service providing message.

In addition, as a result of examination, if it is not possible to be provided with the service of a different service version, the client processing unit 310 of the ECU 3 according to the present embodiment searches for another server that can provide the desired service. Accordingly, there is the possibility that the client processing unit 310 can be provided with the required service from another server.

In addition, the client processing unit 310 of the ECU 3 according to the present embodiment transmits a search message, after startup or restart of the ECU 3 or the client processing unit 310. Accordingly, after startup or restart, the client processing unit 310 can promptly search for a server that can provide a required service.

In addition, in the in-vehicle information processing system according to the present embodiment, the client processing unit 310 is included in the ECU 3, and the server processing unit 210 is included in the ECU 2. The client processing unit 310 of the ECU 3 transmits/receives a request message and a response message to/from the ECU 2 that includes the server processing unit 210. Accordingly, the client processing unit 310 of the ECU 3 can perform information processing that uses a service that the ECU 2 of another ECU provides.

Note that, in the present embodiment, a configuration is adopted in which the ECUs 2 and 3 of the in-vehicle information processing system transmit/receive messages related to a service in accordance with the SOME/IP standard, but there is no limitation thereto, and a configuration may also be adopted in which messages are transmitted/received in accordance with a standard other than the SOME/IP standard. A technique described in the present embodiment can be used in any system in which a server and a client transmit/receive messages to/from each other.

Modified Example

Figure 12:
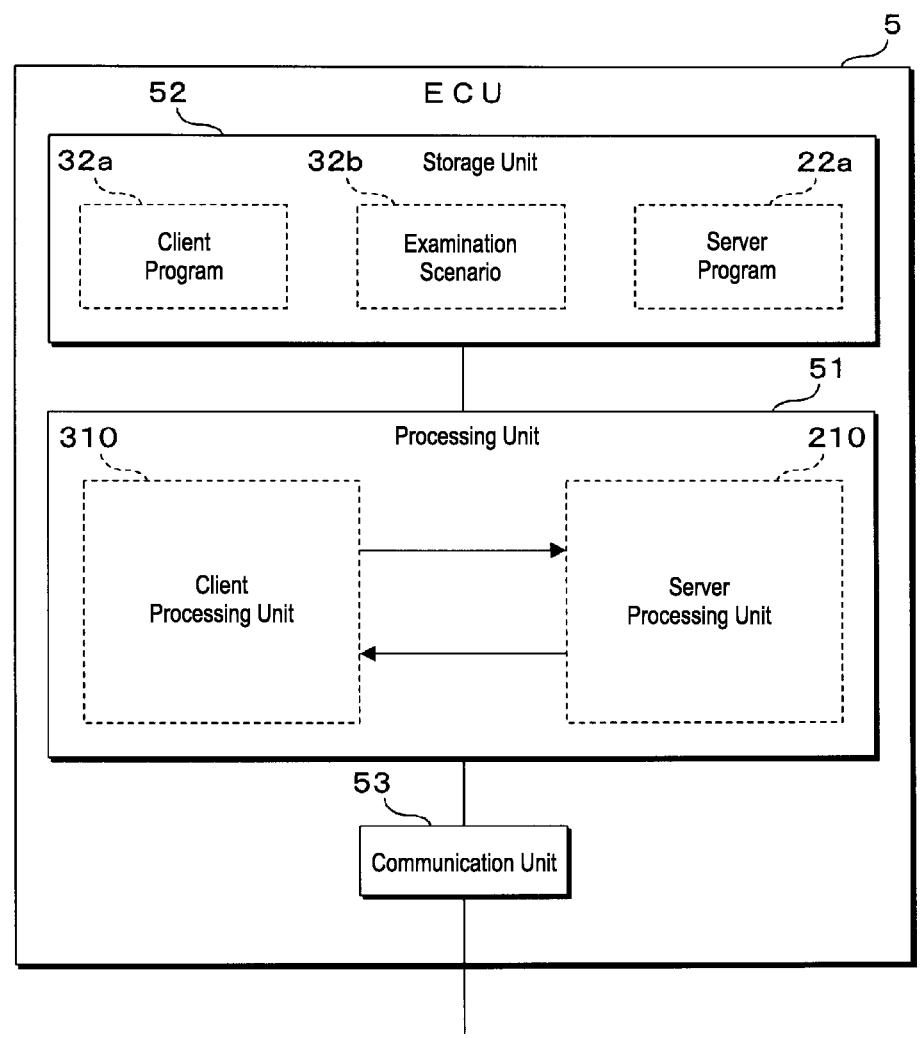
FIG. 12 is a schematic diagram for illustrating the configuration of an in-vehicle information processing system according to Modified Example.

FIG. 12 is a schematic diagram for illustrating the configuration of an in-vehicle information processing system according to Modified Example. In the in-vehicle information processing system according to Modified Example, one ECU 5 includes both a client processing unit 310 and a server processing unit 210. The ECU 5 according to Modified Example is constituted by a processing unit 51, a storage unit 52, a communication unit 53, and the like. The storage unit 52 includes the client program 32a and the server program 22a. In the ECU 5, the client processing unit 310 is realized as a software-like function unit by the processing unit 51 reading out and executing the client program 32a stored in the storage unit 52. Similarly, in the ECU 5, the server processing unit 210 is realized as a software-like function unit by the processing unit 51 reading out and executing the server program 22a. The processing unit 51 can, for example, operate a plurality of programs in parallel through time-sharing, and the client processing unit 310 and the server processing unit 210 operate in parallel.

In the ECU 5 according to Modified Example, the client processing unit 310 and the server processing unit 210 can transmit and receive a request message and a response message, and can transmit and receive a search message and a service providing message, without communicating with an external apparatus via the communication unit 53. Regardless of whether the server processing unit 210 is inside or outside the apparatus, the client processing unit 310 can perform processing for searching for a server processing unit 210 that provides a service required for processing that is performed by the client processing unit 310, processing for examining whether or not the service of a different service version can be received, processing for requesting the server processing unit 210 to provide a service, and the like.

Each device in the in-vehicle information processing system is provided with a computer constituted by a microprocessor, a ROM, and a RAM. A computational processing unit such as a microprocessor may read out and execute a computer program including some or all of the steps of sequence diagrams or flowcharts, such as those shown in FIGS. 7 to 11, from a storage unit such as the ROM or RAM.

The computer programs of these plurality of devices can each be installed from an external server device or the like. Also, the computer programs of these plural devices are each distributed in a state of being stored in a recording medium such as a CD-ROM, DVD-ROM or semiconductor memory.

The embodiment disclosed herein is to be considered as illustrative and non-limiting in all aspects. The scope of the present disclosure is indicated not by the above-stated meanings but by the scope of claims, and is intended to include all modifications that are within the meanings and the scope that are equivalent to those of the scope of claims.

The invention claimed is:

1. An in-vehicle information processing apparatus comprising:
   a client processing unit configured to be provided with a service and perform processing,
   wherein the client processing unit receives, from a server processing unit configured to provide a service, a service providing message that includes identification information and version information of a service to be provided;
   determines whether or not the version information included in the received service providing message and version information of a service that the client processing unit desires to be provided match;
   if it is determined that the two types of version information do not match, examines whether or not it is possible to receive the service with different version information; and
   if it is possible to receive the service with different version information based on an examination result, is provided with the service and performs processing.

2. The in-vehicle information processing apparatus according to claim 1,
   wherein, if, based on the examination result, it is possible to receive the service with different version information, the client processing unit changes version information of a service that the client processing unit desires to be provided from this point on to the version information included in the service providing message.

3. The in-vehicle information processing apparatus according to claim 2, wherein the client processing unit temporarily changes the version information of the service that the client processing unit desires to be provided to the version information included in the service providing message,
   transmits/receives a message to/from the server processing unit based on the temporarily changed version information, and
   performs examination as to whether or not it is possible to receive the service with different version information based on a result of the transmitted/received messages.

4. The in-vehicle information processing apparatus according to claim 2, wherein the client processing unit transmits a search message for searching for the service that the client processing unit desires to be provided, to the server processing unit, and
   receives the service providing message transmitted by the server processing unit as a response to the search message.

5. The in-vehicle information processing apparatus according to claim 1, wherein the client processing unit temporarily changes the version information of the service that the client processing unit desires to be provided to the version information included in the service providing message,
   transmits/receives a message to/from the server processing unit based on the temporarily changed version information, and
   performs examination as to whether or not it is possible to receive the service with different version information based on a result of the transmitted/received messages.

6. The in-vehicle information processing apparatus according to claim 5, further comprising:
   a storage unit configured to store examination information in which content of a message that is transmitted when the client processing unit performs examination and content of a message that is received from the server processing unit in response to the message are associated with each other.

7. The in-vehicle information processing apparatus according to claim 6, wherein the client processing unit transmits a search message for searching for the service that the client processing unit desires to be provided, to the server processing unit, and
   receives the service providing message transmitted by the server processing unit as a response to the search message.

8. The in-vehicle information processing apparatus according to claim 5, wherein the client processing unit transmits a search message for searching for the service that the client processing unit desires to be provided, to the server processing unit, and
   receives the service providing message transmitted by the server processing unit as a response to the search message.

9. The in-vehicle information processing apparatus according to claim 1, wherein the client processing unit transmits a search message for searching for the service that the client processing unit desires to be provided, to the server processing unit, and
   receives the service providing message transmitted by the server processing unit as a response to the search message.

10. The in-vehicle information processing apparatus according to claim 9, wherein, if it is not possible to receive the service with different version information based on the examination result, the client processing unit searches for another server processing unit capable of providing the service that the client processing unit desires to be provided.

11. The in-vehicle information processing apparatus according to claim 10, wherein the client processing unit transmits the search message after the client processing unit is started.

12. The in-vehicle information processing apparatus according to claim 9, wherein the client processing unit transmits the search message after the client processing unit is started.

13. The in-vehicle information processing apparatus according to claim 1, wherein the client processing unit transmits/receives a message to/from another apparatus that includes the server processing unit.

14. The in-vehicle information processing apparatus according to claim 1, further comprising:
    the server processing unit.

15. An information processing method in which a client processing unit of an in-vehicle information processing apparatus is provided with a service from a server processing unit and performs processing, the method comprising:
    receiving a service providing message that includes identification information and version information of a service to be provided, from the server processing unit, determining whether or not the version information included in the received service providing message and version information of a service that the client processing unit desires to be provided match;

if it is determined that the two types of version information do not match, examining whether or not it is possible to receive the service with different version information; and if it is possible to receive the service with different version information based on an examination result, receiving the service and performing processing.

16. A computer program product disposed in an information apparatus mounted in a vehicle, the computer program comprising a non-transitory, machine-readable medium storing instructions which, when executed by at least one programmable processor, causes at least one programmable processor to perform operations for causing the information processing apparatus to perform the following steps:

receiving, from a server program providing a service, a service providing message that includes identification information and version information of a service to be provided;

determining whether or not the version information included in the received service providing message and version information of a service that the client program desires to be provided match;

if it is determined that the two types of version information do not match, examining whether or not it is possible to receive the service with different version information; and if it is possible to receive the service with different version information based on an examination result, receiving the service.

\* \* \* \* \*